June 8, 1926.
R. S. McNEIL
1,587,782
METHOD OF AND APPARATUS FOR INDICATING PROGRESS OF CHEMICAL REACTIONS
Filed Jan. 3, 1924
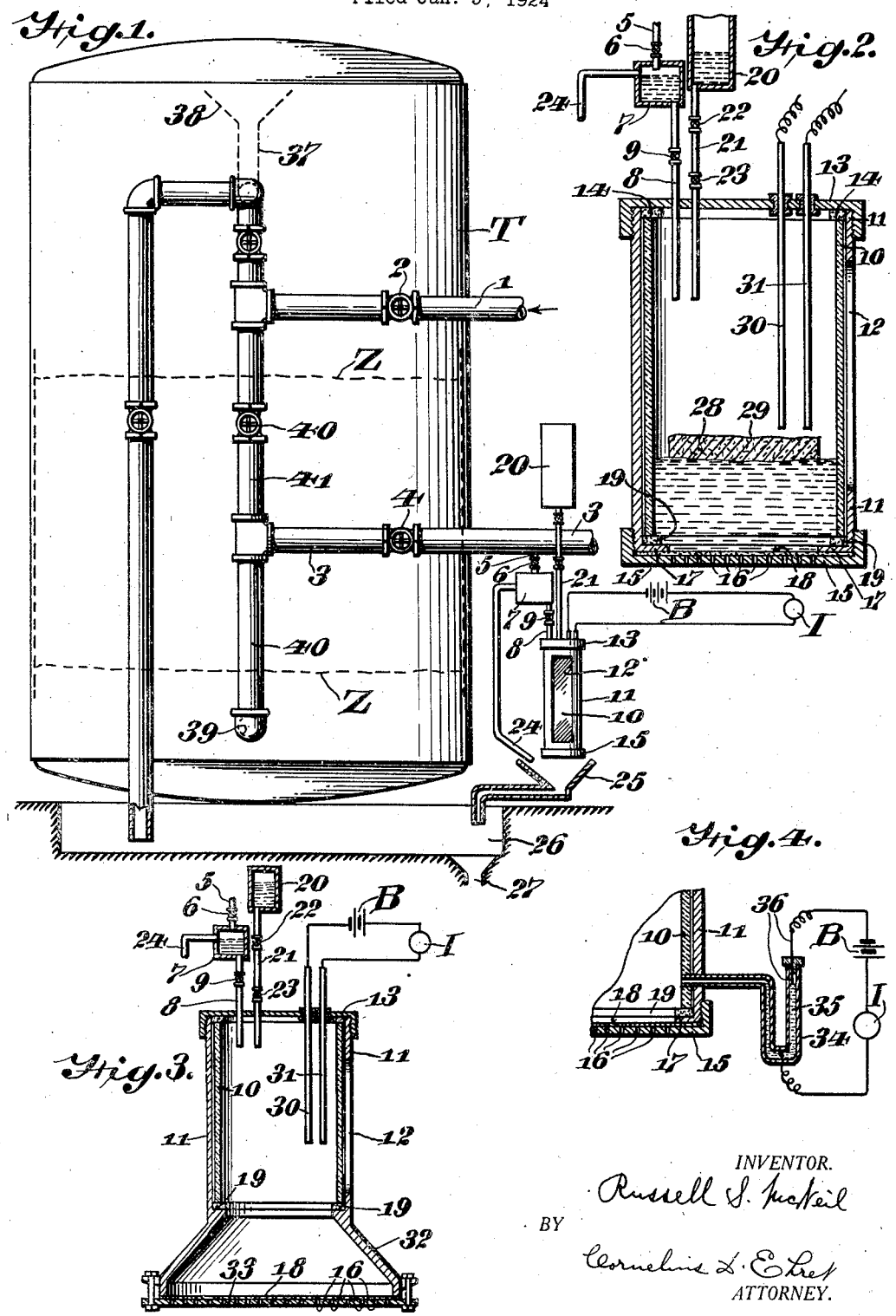
INVENTOR.
Russell S. McNeil
BY
Cornelius L. E?????
ATTORNEY.

Patented June 8, 1926.

1,587,782

UNITED STATES PATENT OFFICE.

RUSSELL S. McNEIL, OF PHILADELPHIA, PENNSYLVANIA, ASSIGNOR TO COCHRANE CORPORATION, OF PHILADELPHIA, PENNSYLVANIA, A CORPORATION OF PENNSYLVANIA.

METHOD OF AND APPARATUS FOR INDICATING PROGRESS OF CHEMICAL REACTIONS.

Application filed January 3, 1924. Serial No. 684,266.

My invention relates to a method of and apparatus for indicating, visually, audibly or otherwise, the progress of chemical reactions and like effects.

In accordance with my invention, to a fluid, as liquid, gas or vapor, consisting of or having as a content a product or products of chemical reaction or analogous effect, is applied a material, as a chemical reagent, producing or causing separation from the fluid of solid or semi-solid material utilized to cause an indication of the nature or condition of the fluid.

More particularly in accordance with my invention water which has been in contact with a softening agent, such as a base-exchange compound, as zeolite, flows through a passage in mixture with a reagent which, while the water is suitably soft or to a suitable degree free of certain compounds, produces no effect, but which if the water contains to substantial degree a compound of a character which should have been acted upon by the base-exchange substance, will produce a precipitate which acts to produce an indication showing that the base-exchanging substance is nearing exhaustion or is exhausted and requires revivification.

My invention resides in a method of and apparatus of the character hereinafter described and claimed.

For an understanding of my method and for an illustration of some of the various forms my apparatus may take, reference is made to the accompanying drawing, in which:

Fig. 1 is in part a side elevational view, partly in vertical section, and partly diagrammatic, of apparatus embodying my invention.

Fig. 2 is a vertical sectional view, on enlarged scale, of part of the structure of Fig. 1.

Fig. 3 is a vertical sectional view, partly in elevation, of a modification of apparatus in accordance with my invention.

Fig. 4 is a fragmentary vertical sectional view of a further modification of apparatus in accordance with my invention.

Referring to Figs. 1 and 2, T is a treating tank in which a fluid undergoes treatment by chemical or other action, the raw or untreated fluid entering by the pipe 1 controlled by the valve 2, and the treated fluid leaving by the pipe 3 controlled by the valve 4. A small fraction of the treated fluid, as liquid, is diverted through the pipe 5, controlled by valve 6, into the receptacle 7 from which it is delivered through the pipe 8, controlled by valve 9, into the chamber or container 10, which may be of glass, disposed within the casing or cage 11 cut away, as at 12, to permit view of the interior of the chamber 10. Threaded on to one end of the housing 11 is the cap 13 between which and the end of the chamber 10 is the packing or gasket 14. Similarly threaded upon the lower end of the housing 11 is the cap 15 having a suitable number of apertures or perforations 16. Between the cap 15 and the flange 17 of the housing 11 is disposed the filter medium 18, such as filter paper, overlying the apertures 16. Between the flange 17 and the container 10 is disposed a gasket 19, the gaskets 14 and 19 rendering the chamber 10 fluid tight except for the medium 18 and apertures 16.

In a container 20 is stored suitable fluid reagent or other suitable material, as for example a solution of a reagent which is delivered through the pipe 21, controlled by the shut-off valve 22 into the container 10. The rate of delivery of material from the chamber 20 is controlled by the valve 23, when the shut-off valve 22 is open. The rate of delivery of material from the chamber 20 is adjusted by the valve 23 to suitable magnitude in relation to the magnitude of rate of delivery of fluid from chamber 7 as determined by the valve 9, the head of fluid within the chamber 7 being maintained constant by provision of the overflow pipe 24 delivering into the funnel 25 which in turn delivers into the chamber 26 which in turn delivers to waste or sewer through the outlet 27.

When the nature of the fluid delivered from the tank T through the pipe 3 is that desired or when its content of one or more predetermined compounds or materials is of suitable character or proportion, the fluid, together with the fluid delivered from the chamber 20 will flow through the medium 18 and apertures 16 to the funnel 25 and thence to waste without accumulation of fluid in the chamber 10. But when the nature of the fluid delivered from the tank T through the pipe 3 or its content of predetermined compound or compounds or materials changes, the fluid from the chamber 20, (being chosen of a character suitable for the purpose) reacts with the fluid or content of the fluid delivered from pipe 3 into the chamber 10, producing a precipitate, or causing a collection of solid or semi-solid material, which collects upon the medium 18, building up thereon sufficiently to materially reduce the rate of escape of fluid from the chamber 10 through the apertures 16, with resultant accumulation of fluid in the chamber 10 visible from the exterior and indicating that the fluid delivered from the tank T to the pipe 3 has changed in character or that a predetermined material or materials in the fluid have increased from substantially zero quantity to a substantial quantity or has increased from a finite quantity to some greater quantity.

The accumulation of fluid in the chamber 10 may be made more readily observable by utilizing a float 28 which is visible from the exterior. Or, as indicated, the float 28 may carry a sheet of conducting material 29 which, after predetermined rise of level of liquid in the chamber 10 will engage and bridge the contacts 30 and 31 thereby closing an electric circuit including the source of current or battery B and the visual, audible, or other suitable indicator I. Or the float 28 and its conducting member 29 may be omitted, and the circuit may be closed by the conducting fluid contacting with and bridging the electrodes 30 and 31.

As indicated in Fig. 3, the arrangement is similar to that indicated in Figs. 1 and 2 except that the housing or chamber 11 has an enlarged lower portion 32 between whose lower end and the perforating disc 33 is held the medium or filter paper 18. By this arrangement relatively small accumulation of fluid within the chamber 11, 32 will cause relatively greater change in level of liquid within the relatively smaller chamber 10, the liquid, when conducting, closing circuit between the electrodes 30 and 31 to effect an indication by the indicator I. In this case also it will be understood that a float as 28 may be utilized and may be provided with a conducting sheet 29 for engaging and bridging the electrodes 30 and 31.

In Fig. 4 there is connected with the interior of the chamber 10 a U tube 34 in which is disposed a mass of conducting liquid 35, as mercury, with which is permanently connected one terminal of the indicator circuit whose other terminal is the contact 36 with which the conducting liquid 35 contacts when the liquid within the chamber 10 rises to predetermined level.

The foregoing is a description of my invention in its broader aspects. A more specific aspect is the following:

Raw water to be softened is delivered through the pipe 1 into the interior of the tank T through the interior pipe 37 through which it passes to the funnel or distributor 38 from which it overflows into the interior of the tank T above the bed of zeolite Z through which it passes, its soluble salts of magnesium, calcium and barium if present, reacting with the zeolite, the calcium and magnesium, and barium if present being exchanged for the sodium of the zeolite which may be for example a sodium aluminum silicate. The water is by this treatment in effect softened by removal of the magnesium calcium and barium compounds and the treated water, suitably free of these compounds and containing salts, such as sulphate, chloride or bicarbonate of sodium or potassium flows from the space below the zeolite bed through the pipe 39 to the exterior of the chamber T and then upwardly through the pipe 40 and outwardly through the pipe 3, the valve 40, in the pipe 41, being closed.

So long as the zeolite is sufficiently active, and the treated water free to sufficient degree of magnesium, calcium, barium and similar compounds, the reagent from the container 20 will produce no or substantially no precipitate by reaction with a content of the softened water, and the liquid will freely escape from the chamber 10 through the medium 18 and perforations 16.

When however magnesium, calcium, barium or similar compounds appear in the water delivered through the pipe 3, or when the proportion of these compounds or any of them attains a substantial magnitude, as when the zeolite approaches exhaustion or is exhausted as regards exchange of bases, the reagent, which may be of any suitable character, as ammoniacal sodium phosphate, ammonium oxalate, soda ash, or a suitable soap solution, as a solution of a soluble salt of a fatty acid, delivered from the container 20, reacts with the magnesium, calcium, barium or similar compound in the water delivered into the chamber 10 through the pipe 8 to form a precipitate which is retained upon the medium 18 and accumulates sufficiently to cause operation of the indicator I, in the manner hereinbefore described. The observer is then aware that the zeolite is exhausted or is approaching exhaustion and it may then be revivified, as well understood in the art, by shutting off the raw water and passing through the zeolite bed a solution of sodium chloride, for example.

After the zeolite has been revivified the apparatus may be again used as above described, the cap 15 having been first removed to remove the accumulated precipitate, to clean the medium 18 or to substitute a fresh or new filter medium.

What I claim is:

1. The method of indicating a change in the character of a fluid or a content thereof, which comprises passing the fluid through a passage, introducing into the fluid a material effecting upon change of character of the fluid or a content thereof a restriction of said passage, and effecting an indication in response to said restriction of said passage.

2. The method of indicating a change in the character of a fluid or a content thereof, which comprises flowing the fluid through a precipitate-retaining medium, introducing into the fluid a reagent effecting with the fluid or a content thereof a precipitate upon occurrence of predetermined change of character of said fluid or content thereof, restricting fluid flow through said medium by said precipitate, accumulating the fluid in response to the collection of said precipitate upon said medium, and effecting an indication by said accumulation of said fluid.

3. The method of indicating progress of treatment of a fluid, which comprises subjecting the fluid to the action of a treating reagent, passing the treated fluid through a precipitate-retaining medium in mixture with a reagent effecting a precipitate upon change of the character of the treated fluid, restricting the passage of fluid through said medium by said precipitate, and effecting an indication in response to said accumulation of said precipitate upon said medium.

4. The method of indicating progress of treatment of a fluid, which comprises subjecting the fluid to the action of a treating reagent, passing the treated fluid through a precipitate-retaining medium in mixture with a reagent effecting a precipitate upon change of the character of the treated fluid, restricting the passage of fluid through said medium by said precipitate, accumulating the fluid in response to accumulation of said precipitate upon said medium, and effecting an indication in response to said accumulation of said fluid.

5. The method of indicating the progress of softening of water by a zeolitic compound, which comprises passing the water to be softened in contact with a zeolitic compound to effect base-exchange, passing softened water through a passage in mixture with a reagent which effects a precipitate with hardness-imparting content in the treated water to restrict said passage, and effecting an indication in response to said restriction of said passage.

6. The method of indicating the progress of softening of water by a zeolitic compound, which comprises passing the water to be softened in contact with a zeolitic compound to effect base-exchange, passing softened water through a precipitate-retaining medium in mixture with a reagent which effects a precipitate with hardness-imparting content in the treated water to restrict passage of fluid through said medium, accumulating water in response to accumulation of said precipitate upon said medium, and effecting an indication in response to said accumulation of water.

7. Apparatus for indicating a change in the character of a fluid or content thereof comprising a chamber having a fluid outlet, means for delivering fluid to said chamber, means for delivering reagent into said fluid to effect in said chamber an outlet-restricting precipitate, and an indicator controlled in response to restriction of said outlet.

8. Apparatus for indicating a change in the character of a fluid or content thereof, comprising structure forming a passage, means causing delivery of fluid through said passage, means for applying reagent to said fluid to effect a precipitate which restricts said passage, and an indicator controlled in response to restriction of said passage.

9. Apparatus for indicating a change in the character of a water or a content thereof comprising a chamber, a precipitate-retaining medium forming an outlet from said chamber, means for introducing fluid into said chamber, means for introducing into said fluid a reagent which effects a precipitate upon change in character of said fluid or a content thereof, said precipitate retained by said medium to effect accumulation of fluid in said chamber, and an indicator responsive to accumulation of fluid in said chamber.

10. Apparatus for indicating a change in the character of a fluid or a content thereof comprising a chamber having a perforated wall, a precipitate-retaining medium overlying said wall, means for introducing fluid into said chamber, means for introducing into said fluid a reagent which effects with said fluid or a content thereof a precipitate accumulating on said medium, and an indicator controlled in response to accumulation of fluid in said chamber.

11. The combination with water softening apparatus comprising a tank containing water softening material, means for delivering raw water into said tank, and means for carrying off softened water from said tank, of a chamber having a restricted fluid outlet, means for delivering softened water into said chamber, means for delivering into said water a reagent which effects with a hardness-imparting content of said water a precipitate restricting said outlet, and an indicator responsive to accumulation of water in said chamber.

12. The combination with water softening apparatus comprising a treating tank, a base-exchange substance therein, means for delivering raw water into said tank, and means for delivering softened water from said tank, of a chamber having an outlet comprising a precipitate-retaining member, means for diverting into said chamber a portion of the water carried off from said treating tank, means for delivering into said portion of said water a reagent which effects with hardness-imparting content a precipitate accumulating upon said member, and an indicator controlled in response to accumulation of water in said chamber.

13. The method of indicating a change in the character of a fluid or content thereof, which comprises delivering the fluid through a passage, applying to the fluid a reagent causing change in the effective size of said passage in response to change in character of the fluid or a content thereof, and effecting an indication in response to the change in said passage.

14. The method of indicating a change in the character of a fluid or a content thereof, which comprises passing the fluid through a passage, effecting a change of said passage in response to change of character of the fluid or a content thereof, and effecting an indication in response to the change of said passage.

RUSSELL S. McNEIL.